United States Patent

[11] 3,607,311

| [72] | Inventors | Gerhard Julius Hass<br>28 Arcadia Road, Woodcliff Lake, N.J. 07675;<br>Nino Insalata, 223 Martha Drive, Battle Creek, Mich. 49015 |
|---|---|---|
| [21] | Appl. No. | 705,898 |
| [22] | Filed | Feb. 16, 1968 |
| [45] | Patented | Sept. 21, 1971 |

[54] OBTULINUM EXOTOXIN INHIBITED FOODS
2 Claims, No Drawings

[52] U.S. Cl. .................................................. 99/154, 99/157, 99/160
[51] Int. Cl. ........................................ A23b 1/00, A23b 3/00
[50] Field of Search ............................................ 99/107, 100, 150, 154, 157, 174, 187, 154, 171; 260/559

[56] References Cited
UNITED STATES PATENTS

| 2,766,124 | 10/1956 | Upham et al. ................ | 99/150 |
| 2,786,768 | 3/1957 | Deatherage ................. | 99/157 X |
| 2,866,708 | 12/1958 | Broquist et al. ............. | 99/157 |
| 2,878,289 | 3/1959 | McCormick et al. ......... | 260/559 |
| 2,934,439 | 4/1960 | Michener et al. ............ | 99/150 X |
| 2,942,982 | 6/1960 | Lewis Wrenshall et al. ... | 99/107 |
| 2,942,986 | 6/1960 | Williams ..................... | 99/174 |
| 3,025,168 | 3/1962 | Greenberg ................... | 99/187 |

OTHER REFERENCES

Food Technology Dec. (1953) Processing Fresh Meat by Infusion of Antibiotics Weiser et al. pages 495–499, 99–157

Am. Soc. for Microbiology, Black et al. 1964 Antimicrobial Agents and Chemotherapy pages 38 thru 41 (Copy in Scientist Library (2nd Fl.)

Encyclopedia of Chemical Technology, Kirk-Othmer (First Supplement Vol. 1957 pages 67–75)

*Primary Examiner*—Norman Yudkoff
*Assistant Examiner*—F. E. Drummond
*Attorney*—LeFever, Quillinan & Hubbard

ABSTRACT: Food spoilage caused by the action of Clostridium botulinum is inhibited by adding small amounts of everninomicin to the food.

OBTULINUM EXOTOXIN INHIBITED FOODS

BACKGROUND OF THE INVENTION

This invention relates to the preservation of foodstuffs and more particularly to the prevention of bacterial spoilage of foods by *Cl. botulinum* (Clostridium botulinum).

There are many problems associated with the preservation of foods. Fresh moist foods having a low acid content can be stored at room temperature for only a short time before bacterial spoilage begins. Various means have been employed to extend the life of foods subject to bacterial spoilage; refrigeration, sterilization by heat, the use of chemicals, the use of hermetically sealed containers. These methods have inherent shortcomings that limit their usefulness by affecting the organoleptic quality of the foods. Refrigeration does not extend the storage life of food for more than a few days to a week. It is not universally available. It does not offer adequate protection when sufficiently low storage temperatures are not maintained. In-process sterilization is used throughout the food industry to prepare canned goods. This method is effective in preserving foods for indefinite times but foods so treated lose flavor due to the high temperatures and long sterilization times necessary to effect sterilization. Heat sterilization often changes the color of the food and it may no longer resemble its fresh counterpart.

One of the most significant problems in the preservation of foods is the prevention of spoilage due to the exotoxin of *Cl. botulinum*. Botulism is a relatively rare, very frequently tragic neuroparalytic disease. It generally results from the ingestion of a foodstuff containing an exotoxin from one of the several known types of Gram-positive rod-shaped anaerobic bacterium called *Cl. botulinum*. In 1963, a total of 47 cases of botulism was reported by the United States National Communicable Disease Center, Atlanta, Georgia. Twenty-four of these cases were due to commercially prepared tuna fish and smoked white fish chubs. The causative organism in each product was *Cl. botulinum* Type E.

*Cl. botulinum* is one of the types of bacteria able to form heat-resistant spores. These spores may germinate and produce vegetative cells capable of producing botulinum exotoxin which causes the disease known as botulism.

The standard industrial heat sterilization of canned goods is designed to destroy these bacterial cells, some of which resist destruction up to 6 hours at atmospheric boiling temperature. However, the susceptibility of some food products to degradation upon heating precludes the degree of heat treatment necessary to kill the spores of *Cl. botulinum*. Therefore, new and better methods of food preservation are constantly being sought.

Recently, a considerable amount of research has been conducted in the use of antibiotics to prevent bacterial spoilage of foods. For example, Deatherage discovered and patented a method of preserving meat which consists of injecting an antibiotic into animals prior to their slaughter, resulting in the destruction of bacteria located in the vascular system. (U.S. Pat. No. 2,786,768).

A new antibiotic, Everninomicin, has been discovered which is effective in inhibiting the activity of some species of harmful bacteria. (Everninomicin, a New Antibiotic Complex from Micromonospora Carbonacea, Weinstein, M. J., et al., Antimicrobial Agents and Chemotherapy, 1964 pp. 24–32). The antibiotic activity of Everninomicin is highly active against Gram-positive bacteria, including strains resistant to other antibiotics. Five active components of this agent have been isolated and identified as Everninomicin A, B, C, D and E. The major chemical component is Everninomicin D.

It has now been discovered that Everninomicin inhibits the spoilage of foods caused by the action of the bacterium *Cl. botulinum*.

Accordingly, it is an object of the present invention to provide a method of inhibiting food spoilage caused by *Cl. botulinum*. It is also an object of this invention to provide fresh food products having a high degree of resistance to spoilage from *Cl. botulinum*. These and other objects of the invention will become obvious from the description and examples presented below.

SUMMARY OF THE INVENTION

According to the present invention a small quantity of the antibiotic Everninomicin is added to a food which is subject to spoilage from exotoxin of *Cl. botulinum*. Any amount of Everninomicin which is effective to prevent the formation of botulinum exotoxin can be used. Generally it has been found that an amount of about 500 to 300,000 units of Everninomicin activity per pound of food product being treated, is sufficient to prevent the production of the botulinum exotoxin.

DESCRIPTION OF THE INVENTION

The antibiotic may be introduced into foodstuffs by any standard method. For example, it may be infused directly into the food or it may be added to a diluent and blended with the food. Among the many diluents suitable for this purpose are liquids such as water, alcohol and propylene glycol or dry powdered substances such as lactose and starch. The diluent permits more accurate measurement of the antibiotic and more uniform distribution of it throughout the food.

The exact method of operation of Everninomicin in preventing food spoilage is not completely known. Examination of foods treated with Everninomicin have shown viable *Cl. botulinum* spores indicating that the antibiotic is not sporicidal. It is believed that the antibiotic prevents the complete development of dividing vegetative cells and renders the bacteria incapable of producing exotoxin. It is possible that it also destroys the exotoxin as it is produced. Whatever the action, foodstuffs treated with Everninomicin have not produced the exotoxin of *Cl. botulinum* in quantities measurable by accepted standard test methods.

Everninomicin has no harmful effect on the human body. Tests have shown that, administered orally, Everninomicin is not absorbed into the blood stream in measurable amounts. Tests have shown that Everninomicin is destroyed by the acid in the stomach of humans and is passed harmlessly through the intestines. (Black, et al., "Pharmacological Properties of Everninomicin D," Antimicrobial Agents and Chemotherapy 1964 pp. 38–46).

In addition to treatment with Everninomicin foods may be subjected to other sterilization methods. Thus, the food may be subjected to a heat treatment for more thorough sterilization Since the Everninomicin contributes to the prevention of bacterial activity it may be possible to use shorter time periods and lower temperatures when heat sterilizing Everninomicin-treated foods, thereby preserving much of the texture, flavor and color of the food that would otherwise be lost.

The following examples will serve to illustrate specific embodiments of the invention.

EXAMPLE I

A quantity of Everninomicin-D, obtained from the Schering Drug Co. and rated at 1,600 units per milligram was dissolved in 95 percent ethyl alcohol and added to a sufficient amount of distilled water to yield a solution having an Everninomicin concentration of five parts per million. Test samples were prepared by adding 2 ml. of the Everninomicin solution to each of duplicate test tubes containing 7 ml. of Duff's enrichment medium and 1 ml. of spore suspension containing 1,000 exotoxin-free spores (See Duff, J. T., et al., Journal of Bacteriology Vol. 73, 1957, pp. 42 et seq. for the preparation of the enrichment medium).

A first control tube containing 9 ml. of Duff's enrichment medium and 1 ml. of the spore suspension, and a second control tube containing 8 ml. of Duff's enrichment medium, 1 ml. of the spore suspension and 1 ml. of 10 percent ethyl alcohol were also prepared.

Exact replicates of the tubes described above were prepared and heated at 100° F. for 15 minutes. All tubes were incubated at 85° F. under 10 percent $CO_2$–90 percent nitrogen atmosphere.

After 5 days incubation all tubes were analyzed for *Cl. botulinum* exotoxin by standard mouse inoculation procedures. Tests showed that no exotoxin was produced in any of the tubes containing Everninomicin but it was produced in all of the control tubes. This experiment shows that Everninomicin interferes with the normal production of *Cl. botulinum* exotoxin.

EXAMPLE II

Control samples were prepared as follows: 234 grams of prepared "Birds Eye Frozen Cod Fingers in Butter Sauce" was placed in a food mixer. 66 ml. of Type E *Cl. botulinum* inoculum containing $9.2\times10^5$ spores was added to the fish and the mixture was blended for 5 minutes. Samples were packaged and incubated at 40° F. according to the procedure of Example I.

Test samples were prepared as follows: 234 g. of cod fingers was placed in the mixer. 6 ml. of stock solution containing 50 p.p.m. Everninomicin D and 27 ml. of water were mixed with the cod fingers. Then $9.2\times10^5$ Type E botulinum spores in 33 ml. of water was mixed to the fish. The cod fingers were divided into six samples and were packaged and incubated in the manner described above. The samples were then stored at 40–50° F. After 12 weeks storage they were analyzed for exotoxin. The control samples contained exotoxin but the samples containing Everninomicin were free of exotoxin. This example demonstrates the effectiveness of Everninomicin in inhibiting the production of botulinum exotoxin in fish.

EXAMPLE III

In this example ground beef which has been autoclaved at 15 p.s.i.g. for 15 minutes to destroy indigenous microflora was used as the test material. Control samples were prepared by blending 200 g. of the sterile ground meat for 15 minutes in a 5-quart Hobart mixer with 30 ml. of an aqueous suspension containing $2.4\times10^6$ spores of *Cl. botulinum* Type A. The mixture was divided into six equal portions and sealed in a nitrogen atmosphere in polymylar bags.

Test samples were prepared as follows: 200 g. of sterile ground beef was blended for 15 minutes with 15 ml. of water containing 18.2 mg. of the water-soluble sodium salt of Everninomicin B containing 1,011 units of Everninomicin per mg. 15 ml. of spore suspension containing $2.4\times10^6$ spores were then mixed with the meat for 15 minutes. The resulting mixture was divided into six equal portions and sealed in a nitrogen atmosphere in polymylar bags.

The samples were stored at room temperature and analyzed after one week. The control samples contained exotoxin but the Everninomicin-protected samples did not. After 12 days the samples were again analyzed with the same result. Standard mouse inoculations of the samples demonstrated that the Everninomicin prevented intoxication. The spores in the Everninomicin samples were found to be still viable and toxigenic when removed from the effects of the Everninomicin. This example demonstrates the effectiveness of Everninomicin in inhibiting the production of botulinum exotoxin in meat.

Although the invention has been described with references to specific examples, it is understood that the scope of the invention is limited only by the breadth of the appended claims.

What is claimed is:

1. A food composition substantially free of botulinum exotoxin and containing about 500–300,000 units of Everninomicin per pound of food, the Everninomicin being selected from the group consisting of Everninomicin B and Everninomicin D.

2. A food composition according to claim 1 wherein the food is selected from the group consisting of meat, fish and vegetables.